US010358754B2

(12) United States Patent
Sano et al.

(10) Patent No.: US 10,358,754 B2
(45) Date of Patent: Jul. 23, 2019

(54) SEWING SYSTEM

(71) Applicant: JUKI CORPORATION, Tokyo (JP)

(72) Inventors: Takahiro Sano, Tama (JP); Toshiaki Sakaeda, Tama (JP)

(73) Assignee: JUKI CORPORATION, Tama-shi, Tokyo (JP)

( * ) Notice: Subject to any disclaimer, the term of this patent is extended or adjusted under 35 U.S.C. 154(b) by 119 days.

(21) Appl. No.: 15/704,536

(22) Filed: Sep. 14, 2017

(65) Prior Publication Data

US 2018/0080155 A1 Mar. 22, 2018

(30) Foreign Application Priority Data

Sep. 16, 2016 (JP) ................................. 2016-181358

(51) Int. Cl.
*D05B 19/14* (2006.01)
*D05B 19/12* (2006.01)
*B25J 18/04* (2006.01)
*B25J 19/02* (2006.01)
*D05B 29/06* (2006.01)
*D05B 55/14* (2006.01)
*D05B 57/30* (2006.01)
*D05B 69/30* (2006.01)
*D05B 87/00* (2006.01)
(Continued)

(52) U.S. Cl.
CPC .............. *D05B 19/14* (2013.01); *B25J 11/00* (2013.01); *B25J 15/0019* (2013.01); *B25J 18/04* (2013.01); *B25J 19/023* (2013.01); *D05B 19/12* (2013.01); *D05B 29/06* (2013.01); *D05B 55/14* (2013.01); *D05B 57/30* (2013.01); *D05B 69/30* (2013.01); *D05B 87/00* (2013.01)

(58) Field of Classification Search
CPC ........ D05B 19/00; D05B 19/02; D05B 19/12; D05B 19/14; D05B 23/00
USPC .................................................. 700/136–138
See application file for complete search history.

(56) References Cited

U.S. PATENT DOCUMENTS 4,957,054 A * 9/1990 Sakuma ................. A41D 27/10
112/470.13
4,998,489 A * 3/1991 Hisatake ................ D05B 19/08
112/103
(Continued)

FOREIGN PATENT DOCUMENTS

JP H05-305193 A 11/1993

*Primary Examiner* — Nathan E Durham
(74) *Attorney, Agent, or Firm* — Drinker Biddle & Reath LLP

(57) ABSTRACT

A sewing system comprises a sewing machine, a camera that captures an image of a reference position for sewing, a robot arm that holds the sewing machine and the camera, and a controller. The controller controls operations of forming a first stitch position that results from stitching of the sewing machine, and forming a second stitch position that results from stitching of the sewing machine after rotating the sewing machine at a prescribed angle about a rotation axis that passes through a needle center position stored by the controller. The controller further performs calibration processing that calibrates the needle center position stored by the controller, based on each position of the first stitch position and the second stitch position within image capture ranges of capture images that are obtained by capturing images of the first stitch position and the second stitch position using the camera.

2 Claims, 9 Drawing Sheets

(51) Int. Cl.
*B25J 11/00* (2006.01)
*B25J 15/00* (2006.01)

(56) References Cited

U.S. PATENT DOCUMENTS

| | | | | |
|---|---|---|---|---|
| 5,027,726 | A * | 7/1991 | Brower | D05B 11/00 |
| | | | | 112/117 |
| 5,313,897 | A * | 5/1994 | Katamine | B25J 15/0019 |
| | | | | 112/470.13 |
| 5,381,743 | A * | 1/1995 | Moll | D05B 23/00 |
| | | | | 112/2.1 |
| 5,875,726 | A * | 3/1999 | Keilmann | B25J 9/0084 |
| | | | | 112/470.13 |
| 5,988,085 | A * | 11/1999 | Martz | D05B 39/00 |
| | | | | 112/470.13 |
| 8,286,568 | B2 * | 10/2012 | Tokura | D05B 19/12 |
| | | | | 112/102.5 |
| 2007/0005175 | A1 * | 1/2007 | Konig | D05B 19/00 |
| | | | | 700/138 |
| 2008/0078313 | A1 * | 4/2008 | Hamajima | D05B 19/08 |
| | | | | 112/103 |
| 2014/0033960 | A1 * | 2/2014 | Evans | D05B 19/12 |
| | | | | 112/470.02 |

\* cited by examiner

SEWING SYSTEM

CROSS-REFERENCE TO RELATED APPLICATION

The present application claims the benefit of priority in Japanese Patent Applications No. 2016-181358, filed on Sep. 16, 2016, the disclosure of which is incorporated herein by reference.

TECHNICAL FIELD

The present invention relates to a sewing system in which a robot arm is equipped with a sewing machine.

BACKGROUND ART

In the related art, a sewing system has been developed in which a front end portion of a robot arm is equipped with a sewing machine and sewing is performed on a curved surface which is three-dimensionally shaped without the sewing being limited to a flat surface.

When sewing begins in this sewing system, if a needle center position of the sewing machine which is set in a coordinate system of the robot arm, and an actual needle center position of the assembled sewing machine are not precisely consistent with each other, the sewing as desired cannot be performed, and an improvement in sewing quality cannot be achieved (for example, refer to JP-A-H05-305193).

The needle center position of the sewing machine which is set in the coordinate system of the robot arm and the actual needle center position of the sewing machine are precisely consistent with each other if the sewing machine is precisely assembled to the robot arm, but this requires high precision for assembling work of the sewing machine and causes a problem that the burden of the assembling work becomes very large.

SUMMARY OF THE INVENTION

The present invention aims at improving sewing quality while reducing the burden and has the following features (1) or (2).

(1) A sewing system comprising:
a sewing machine;
a camera that captures an image of a reference position for sewing;
a robot arm that holds the sewing machine and the camera; and
a controller, wherein
the controller controls operations of:
forming a first stitch position that results from stitching of the sewing machine; and
forming a second stitch position that results from stitching of the sewing machine after rotating the sewing machine at a prescribed angle about a rotation axis that passes through a needle center position stored by the controller, and
the controller further performs calibration processing that calibrates the needle center position stored by the controller, based on each position of the first stitch position and the second stitch position within image capture ranges of capture images that are obtained by capturing images of the first stitch position and the second stitch position using the camera.

(2) The sewing system according to (1), wherein
the robot arm includes a first joint that causes the entire robot arm to rotate about an axis in a vertically upward and downward direction,
for a stitch position that is set to be a target, the controller controls operations of:
forming a third stitch position using the sewing machine after a positioning operation that results from rotation in a fixed direction in the first joint and forming a fourth stitch position using the sewing machine after a positioning operation that results from rotation in a direction opposite to the fixed direction in the first joint;
capturing images of the third stitch position and the fourth stitch position using the camera; and
acquiring an amount of backlash that occurs in the first joint, based on each position of the third stitch position and the fourth stitch position within image capture ranges, respectively.

According to the present invention, the controller can more precisely recognize the actual needle center position of the sewing machine and the stitch position of the sewing machine can be more accurately positioned by the robot arm, so that it is possible to improve the sewing quality without applying the burden to the operator.

DETAILED DESCRIPTION

Entire Configuration of Sewing System

Figure 1:
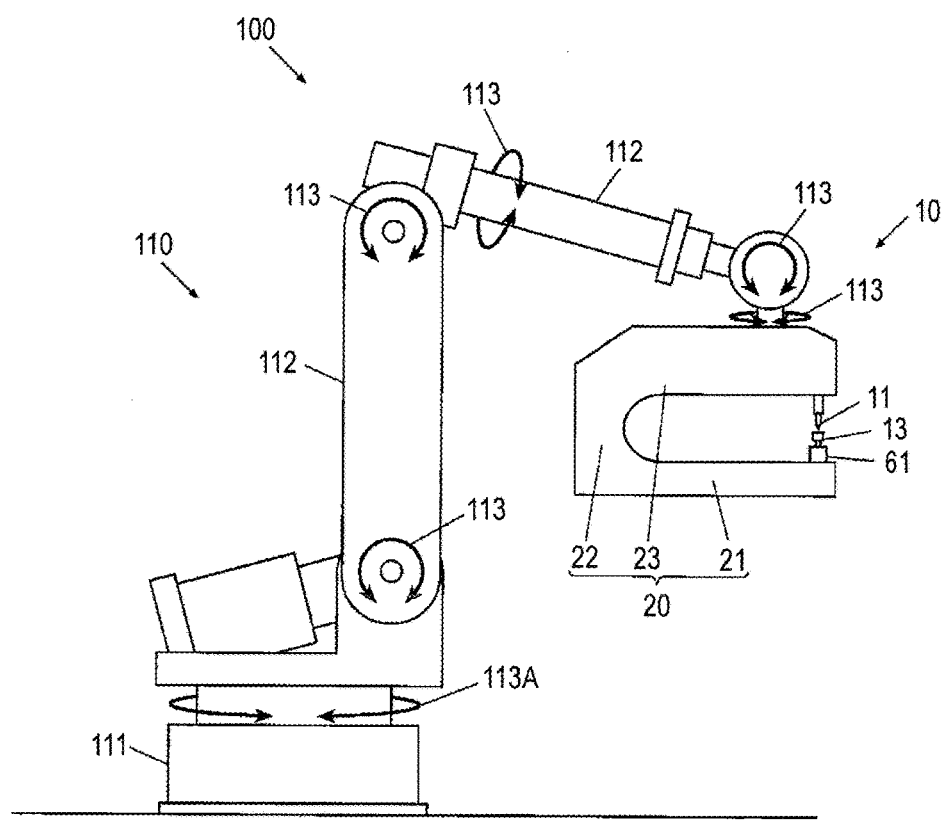
FIG. 1 is a side view illustrating an entire configuration of a sewing system according to an embodiment of the present invention.

A sewing system 100 according to an embodiment of the present invention will be described below with reference to the drawings. FIG. 1 is a side view illustrating an entire configuration of the sewing system 100.

The sewing system 100 includes a sewing machine 10 that perform is sewing of a workpiece, a robot arm 110 that not only holds the sewing machine 10, but also positions the held sewing machine 10 with respect to the workpiece and performs arbitrary sewing, and a controller 90 that controls each of the constituents described above.

Robot Arm

The robot arm 110 is a vertical articulated-type robot arm that includes a base 111 that serves as a foundation, multiple arms 112 that are connected with joints 113, respectively, a servomotor 114 as a drive power source that is provided in each of the joints 113, and an encoder 115 that detects each arm angle at which rotation or driving is performed by each servomotor 114. The sewing machine 10 is held in a front end portion of the multiple arms 112 that are connected with the joints 113, respectively.

Each of the joints 113 described above is configured with any one of a rocking joint that enables one end portion of the arm to rock and shaft-supports the other end portion, and a rotation joint that shaft-supports so that the arm itself is enabled to rotate about the longitudinal direction of the arm.

The robot arm 110 includes six joints 113, and can position the sewing machine 10 on the front end portion of the joints in an arbitrary position using six axes, and can take an arbitrary posture.

Therefore, it is possible that the robot arm 110 is caused to perform the sewing along an arbitrary curve on a three-dimensional surface of the workpiece.

The joint 113 that is the closest to the base 111, which is positioned on the bottom of the robot arm 110, is defined as a first joint 113A. It is possible that this first joint 113A causes the entire robot arm 110 to rotate about an axis in a vertically upward and downward direction, except for the base 111.

Without being limited to the six shafts, the robot arm 110 may employ seven shafts that have seven joints. In that case, because a redundant joint occurs, the joint in the middle can be caused to move while the sewing machine 10 is positioned in an arbitrary position and takes an arbitrary posture is taken. Thus, interference with other constituent objects in the vicinity of the robot arm 110 can be avoided. Therefore, the sewing machine 10 can be positioned in an arbitrary position in a wider range and can take an arbitrary posture.

The front end portion of the arm of the robot arm 110 holds an upper part of a front end portion (a needle bar-side end portion) of a arm portion 23 in a sewing machine frame 20 of the sewing machine 10, and thus a distance can be reduced between the vicinity of a stitch position of the sewing machine 10 and the front end portion of the arm of the robot arm 110 and it is possible to position the stitch position more precisely.

Sewing Machine

Figure 2:
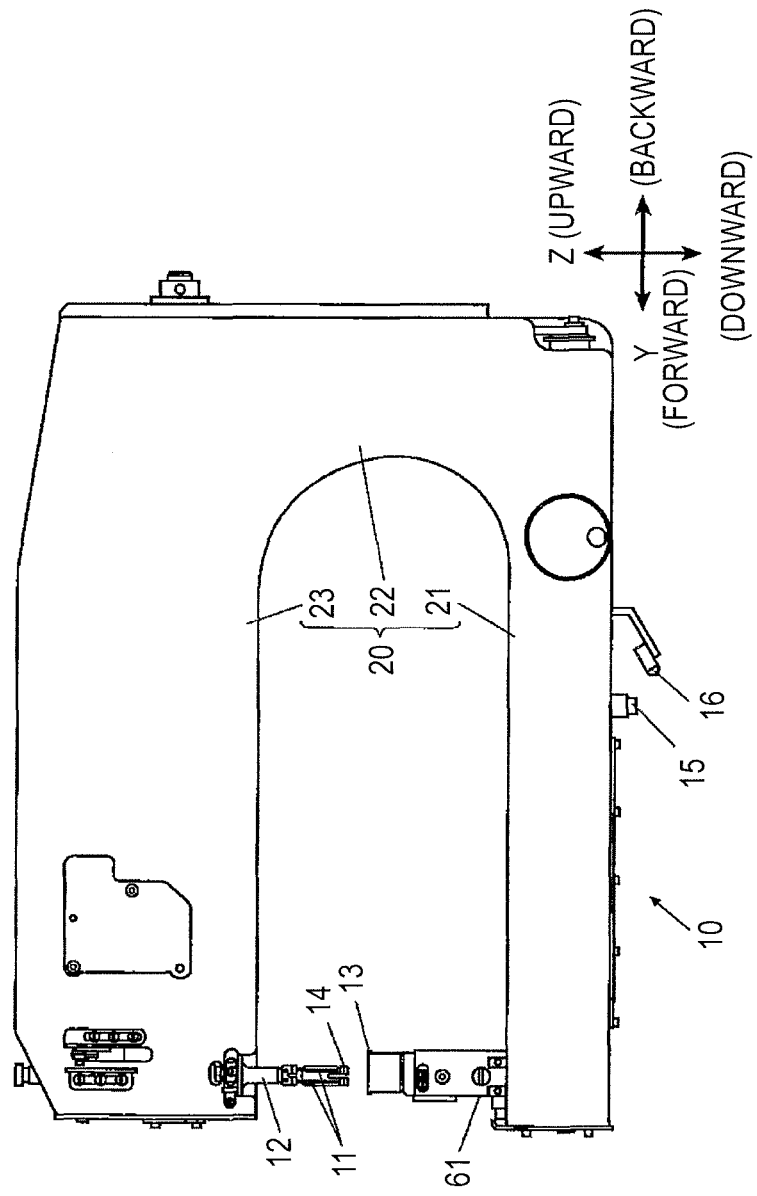
FIG. 2 is a side view illustrating a sewing machine in a state where a throat plate is in an upper position.
Figure 3:
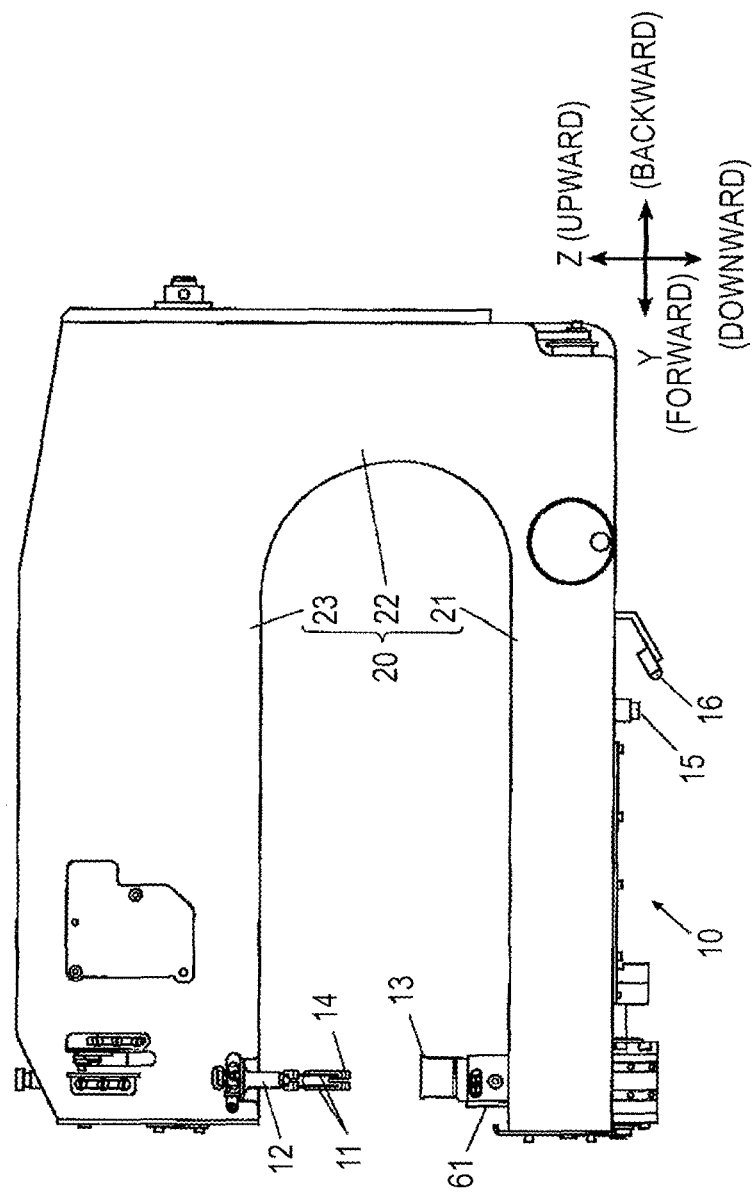
FIG. 3 is a side view illustrating the sewing machine in a state where the throat plate is in a lower position.

FIGS. 2 and 3 are side views of the sewing machine 10. In the sewing machine 10, as illustrated in FIGS. 2 and 3, a throat plate 13 and a foundation 61 that supports the need plate 13 are supported to be possibly raised and lowered with respect to a bed portion 21 of the sewing machine frame 20. The sewing is performed in ascending positions of the throat plate 13 and the foundation 61, which are illustrated in FIG. 2. An operation of preparing for the sewing, such as setting of the workpiece in a descending position that is illustrated in FIG. 3, is performed.

The sewing machine 10 described above includes a needle bar 12 that holds two sewing needles 11 in the lower end portion thereof, a needle bar vertically-moving mechanism that enables the needle bar 12 to perform an operation of vertical reciprocation, a looper mechanism that causes a looper thread to be inserted into a needle thread passed through each sewing needle 11 by two loopers, a raising and lowering mechanism that performs an operation of raising and lowering the foundation 61 that holds the throat plate 13 and a looper, a presser 14 that, from above, presses the workpiece against the throat plate 13 in the ascending position, a camera 15, as an image capture device, that captures an image of a reference line which is formed on the workpiece, a laser 16, as a light source, that emits slit light for suitably performing image capturing of the reference line to the workpiece, and the sewing machine frame 20 that supports each of the constituents described above.

The sewing machine frame 20 includes the bed portion 21 that extends in a predetermined longitudinal direction, an upright drum portion 22 that is provided in the upright position toward a direction from one end portion of the bed portion 21 in the upright position toward a direction that is orthogonal to a longitudinal direction of the bed portion 21, and the arm portion 23 that extends from a head portion of the upright drum portion 22 in the same direction as the bed portion 21.

In the following description of each of the constituents of the sewing machine 10, a longitudinal direction of the bed portion 21 is defined as the Y-axis direction, a direction that is orthogonal to the Y-axis direction and in which the upright drum portion 22 is provided in the upright position is defined as the Z-axis direction, and a direction that is orthogonal to the Y-axis direction and the Z-axis direction is defined as the X-axis direction.

One side of the Y-axis direction is defined as a front direction, and the other side as a rear direction. One side of the X-axis direction is defined as a left-hand direction (backward toward the rear surface of the sheet in FIG. 2), and the other side as the right-hand direction (forward toward the front surface of the sheet in FIG. 2). One side of the Z-axis direction is defined as an upward direction and the other side as a downward direction.

The needle bar vertically-moving mechanism has a well-known configuration in which an upper shaft is driven for rotation with a sewing machine motor 24 as a drive power source and in which the needle bar 12 is caused to be raised and lowered through a cranking mechanism.

An upper shaft of the needle bar vertically-moving mechanism extends along the Y-axis direction within the arm portion 23, and provides torque to a lower shaft that causes the looper mechanism to be driven through a belt mechanism which is not illustrated.

The presser foot 14 is held in a lower end portion of a presser bar 141 that runs along the Z-axis direction, which is positioned adjacent to the left side of the needle bar 12, and provides pressing power in a downward direction by means of a presser spring (not illustrated) through the presser bar 141.

A presser lifting mechanism (not illustrated) is provided together in the presser foot 14, and the presser foot 14 can be held in a retreat position that is positioned more upward, when the sewing is not performed. The presser lifting mechanism may perform a manual operation, but it is desirable that switching between the retreat position and a sewing position possibly takes place according to a control signal, using an actuator.

The looper mechanism includes two loopers that are provided under the throat plate in a manner that corresponds to two sewing needles, respectively, a lower shaft through which torque is transferred from the sewing machine motor 24 and which is possibly divided into two parts, and a cam mechanism that enables each looper to perform a locking operation of reciprocation. The two loopers and the cam mechanism are supported by the foundation 61 that will be described below.

In a state where two loopers are arranged side by side in the Y-axis direction, a sharp front end portion of each looper is toward the left and the locking causes the front end portion to plunge into a loop of a needle thread that is caused to pass through each throat plate 13. Thus, the loop of the needle thread is not only captured, but the looper thread is also caused to be inserted. Retraction of the looper makes a loop of a looper thread formed and makes the sewing needle 11 plunge into the loop of the looper thread to capture the looper thread. By reiterating all of this processing, formation of a seam is performed.

It is possible that the lower shaft is divided into two parts, a front-side part and a rear-side part. The front-side part, along with the looper and the cam mechanism, is supported by the foundation 61 to possibly rotate.

The front-side part of the lower shaft provides torque to the cam mechanism. With a rotation cam, the cam mechanism enables a locking arm that supports the looper to perform the locking operation of reciprocation.

With the rear-side part of the lower shaft, as described above, torque is transferred by the belt mechanism from the upper shaft.

The front-side part and the rear-side part of the lower shaft are usually arranged on the same axis, and are connected to each other with an Oldham coupling. Thus, it is possible that the front-side part and the rear-side part rotate in a manner that interlocks with each other. When the foundation 61 is lowered to separate the throat plate 13 from the sewing needle 11, the characteristics of the Oldham coupling make the front-side part move in a manner that slides with respect to the rear-side part of the lower shaft in order not to prevent the operation of raising and lowering the foundation 61.

If the torque transfer is possible when the front-side part and the rear-side part are on the same axis and if the relative separation between the front-side part and the rear-side part is possible, the lower shaft may employ an interlocking structure other than the Oldham coupling.

The raising and lower mechanism includes the foundation 61 that supports main constituents, such as the throat plate 13 and the looper mechanism, and the cam mechanism that causes the foundation 61 to be raised and lowered.

The foundation 61, as described above, supports the throat plate 13 on the upper end portion thereof, and supports constituents other than the rear-side part of the lower shaft, of the looper mechanism under the throat plate 13.

A right-hand external wall of the foundation 61 is fixedly equipped with a slide rail that runs in the Z-axis direction, which is not illustrated. The sliding along the Z-axis direction is possible with a slide block with which an internal wall of the bed portion 21 is equipped.

The cam mechanism is provided on a left-hand external wall of the foundation 61.

The cam mechanism includes a roller that acts as a cam driven body, which is provided on the foundation 61, a grooved cam that acts as a cam drive body, which is provided on the sewing machine head portion side, and an air cylinder 62 as a drive power source that enables the grooved cam to perform an operation of movement along the forward and backward direction. The cam mechanism includes a cam groove that is formed diagonally in the forward and backward direction and the upward and downward direction. When the cam mechanism moves backward and forward by the air cylinder 62, the roller within the cam groove causes the foundation 61 to be displaced in the upward and downward direction and thus the operation of raising and lowering the foundation 61 is possible.

The camera 15 is positioned on the bottom of the bed portion 21 so that an optical axis is in parallel to the upward and downward direction of the sewing needle 11 and is in the downward direction. In a state where the robot arm 110 is installed on a horizontal surface, a state in which the needle bar 12 is in parallel to the vertically upward and downward direction (the bed portion 21 and the arm portion 23 of the sewing machine frame 20 are in parallel to each other) is defined as a reference posture of the sewing machine 10. In the reference posture, the optical axis of the camera 15 is parallel to the upward and backward direction and is in the downward direction.

The laser 16 is positioned on the bottom of the bed portion 21, in rear of the camera 15, and emits the slit light, which is in parallel to the X-axis direction, diagonally forward in the downward direction.

The reference line that is attached to the workpiece is in the shape of a groove. The emission of the slit light in a direction that intersects the reference line causes a concavity to occur in a reference line position, and thus an image of the reference line position can be clearly captured. An inclination angle of the optical axis of the laser 16 is well known. The controller 90 can obtain a distance in the Z-axis direction (the upward and downward direction) from the camera 15 to the workpiece, according to a position in the Y-axis direction, of the slit light, of which the image is captured within an image capture range of the camera 15.

Control System of Sewing System

Figure 4:
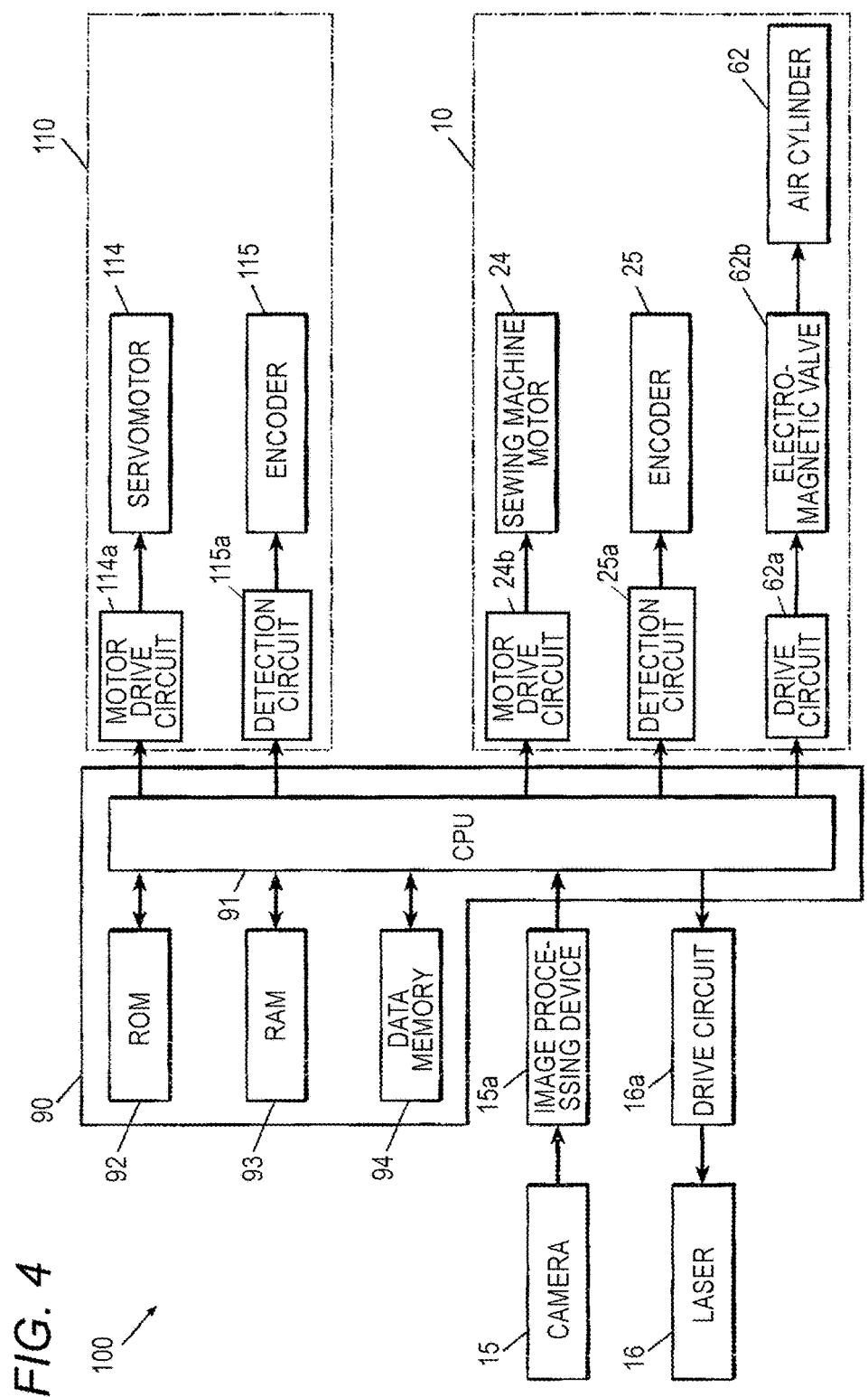
FIG. 4 is a block diagram in a control system of the sewing system.

The controller 90 of the sewing system 100, as illustrated in FIG. 4, includes a read only memory (ROM) 92 in which a program for performing various types of processing or control relating to the sewing is stored, a random access memory (RAM) 93 that serves as a working area for arithmetic operation processing, a rewritable nonvolatile data memory 94 as a storage portion in which various pieces of data and the like are stored, and a central processing unit (CPU) 91 that executes the program within the ROM 92.

The CPU 91 controls driving of the servomotor 114 of the robot arm 110 and the sewing machine motor 24 of the sewing machine 10 through motor drive circuits 114a and 24a. The encoder 115 and an encoder 25 that detect output axis angles are provided together to the servomotor 114 and the sewing machine motor 24, respectively. The CPU 91 is connected through each of the detection circuits 115a and 25a. The robot arm 110 includes the servomotor 114 and the encoder 115 for each of the six joints 113 (including 113A), but only one servomotor 114 and only one encoder 115 are illustrated in FIG. 4 and illustrations of the other servomotors and encoders are omitted.

The CPU 91 is connected to a drive circuit 62a for controlling an electromagnetic valve 62b that causes the air cylinder 62, which performs the operation of raising and lowering the foundation 61 of the sewing machine 10, to operate. The CPU 91 is connected to the camera 15 through an image processing device 15a. The CPU 91 is connected to the laser 16 through a drive circuit 16a.

Calibration Processing of Sewing System

In order for the robot arm 110 to position the stitch position of the sewing machine 10 with high precision, the controller 90 needs to precisely acquire position coordinates (a needle center position and a direction of the sewing machine 10 relative to the front end portion of the robot arm 110) of a needle center position of the sewing machine 10 in a coordinate system (which is assumed to be a front end coordinate system) that is fixed to the front end portion of the robot arm 110.

In a case where the sewing machine 10 is mounted on the front end portion of the robot arm 110, it is possible that the sewing machine 10 knows from design data a relative position relationship between a position that is retained in the robot arm 110 and the needle center position, but because an error in the mounting and the like occur as well, it is difficult to always precisely acquire the position coordinates of the needle center position of the sewing machine 10 in the front end coordinate system of the robot arm 110.

Accordingly, the controller 90 performs calibration processing that will be described below.

The "needle center position" of the sewing machine 10" indicates the middle point (the middle point between positions of two sewing needles 11 when viewed from above) between positions of two sewing needles 11 on an X-Y plane. In a case where the sewing machine 10 is a sewing machine for one needle, the "needle center position" of the sewing machine" indicates a position (a position of one sewing needle 11 when viewed from above) of one sewing needle 11 on the X-Y plane.

Figure 5:
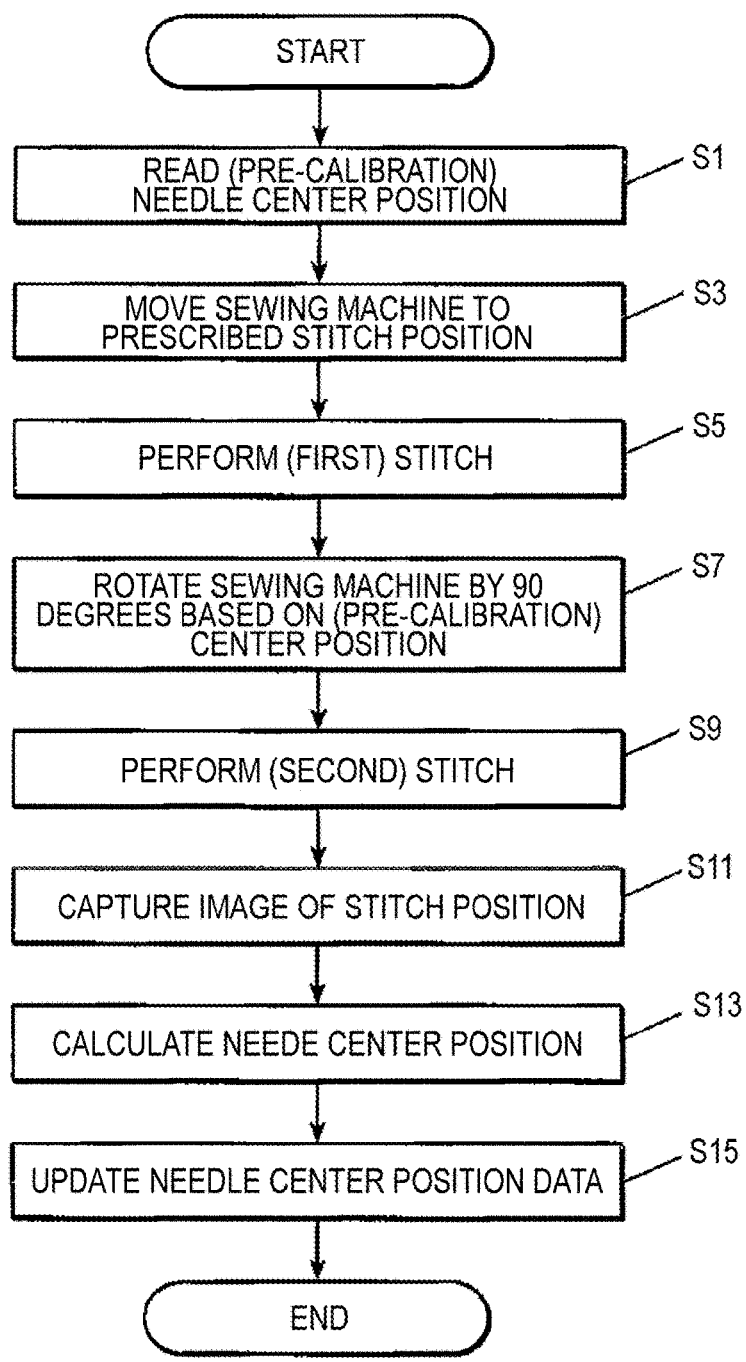
FIG. 5 is a flowchart for calibration processing.

FIG. 5 is a flowchart for the calibration processing that is performed by the CPU 91 of the controller 90 based on the program.

First, the CPU 91 performs processing that reads X-Y coordinate data which indicates a pre-calibration needle center position, from the data memory 94 (Step S1).

Data on the pre-calibration needle center position, for example, is a default value that is obtained from the design data on the sewing machine 10, or is a needle center position that is acquired in the calibration processing which is previously performed.

Next, the CPU 91 causes the servomotor 114 of each of the robot arms 110 to be driven in order for the sewing machine 10 to be transported to a prescribed stitch position (Step S3).

A workpiece or a jig that is easy to recognize from a capture image of the stitch position in a case where stitch is performed is installed in the prescribed stitch position is installed. For example, a hole that is formed as a result of the stitch stands out from the image, but a sheet of white paper or the like is suitable.

Next, the CPU 91 causes the sewing machine motor 24 to be driven, and thus, the first stitch is performed to form a first stitch position (Step S5). At this time, the sewing machine 10 maintains the reference posture in which a longitudinal direction (the upward and downward direction of the needle) of the needle bar 12 is in parallel to the vertically upward and downward direction.

Next, the CPU 91 causes the servomotor 114 of each of the robot arms 110 to be driven, and thus causes the sewing machine 10 to counterclockwise rotate by 90° about a rotation axis along the vertically upward and downward direction, which passes through the center position, based on the data on the pre-calibration needle center position (Step S7).

This rotation operation is performed to maintain the needle center position (a pre-configuration needle center position that is stored in the controller 90) of the sewing machine 10 in an absolute coordinate system (a coordinate system that is fixed regardless of operation of the robot arm 110 with the ground serving as a reference).

A rotation direction of the sewing machine 10 may be a clockwise direction, and it is possible that a rotation angle is changed to an arbitrary angle without being limited to 90° (however, an angle of 360° or an angle that is an integral multiple of) 360°.

The sewing machine motor 24 is caused to be driven, and the second stitch is performed to foil a second stitch position (Step S9).

Next, the CPU 91 causes the servomotor 114 of each of the robot arms 110 to be driven so that both first and second stitch positions also fall within an image capture range of the camera 15, and thus causes the sewing machine 10 to be moved in order for the camera 15 to capture images of the first and second stitch positions (Step S11).

Figure 6:
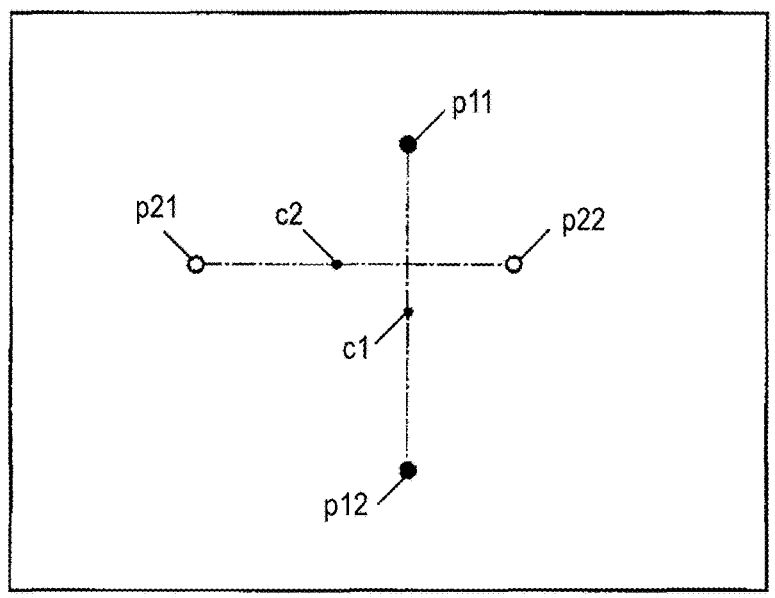
FIG. 6 is an explanatory diagram illustrating capture images at a first and second stitch positions.

FIG. 6 is an explanatory diagram illustrating capture images of the first and second stitch positions.

An image processing device 15a performs pattern matching and the like from the capture image, and extracts the first and second stitch positions. The CPU 91 calculates an actual needle center position of the sewing machine 10.

That is, the CPU 91 specifies a needle center position $c_1$ that is the center point between first stitch positions $p_{11}$ and $p_{12}$, from the first stitch positions $p_{11}$ and $p_{12}$ that result from the extracted first two sewing needles 11. In the same manner, a needle center positions $c_2$ that is the center point between second stitch positions $p_{21}$ and $p_{22}$ is specified from the second stitch positions $p_{21}$ and $p_{22}$ that result from the second two sewing needles 11.

The first stitch positions $p_{11}$ and $p_{12}$, the second stitch positions $p_{21}$ and $p_{22}$, and the needle center positions $c_1$ and $c_2$ are positions in the absolute coordinate system.

Figure 7:
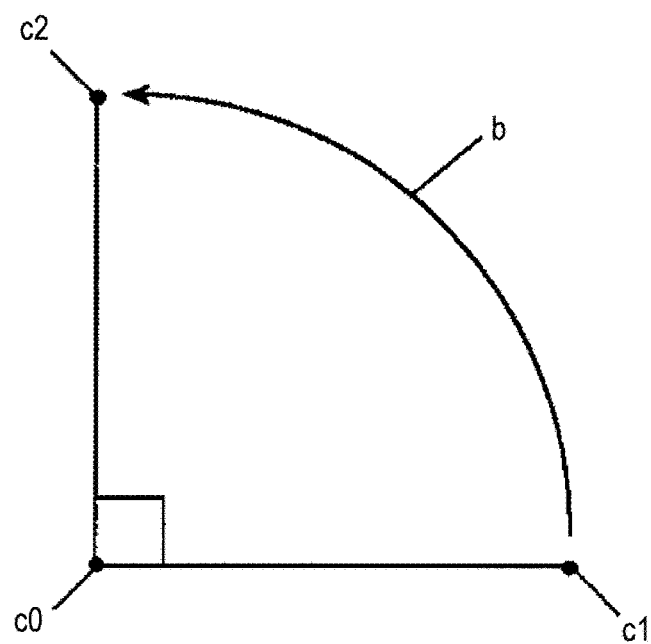
FIG. 7 is an enlarged explanatory diagram illustrating an arrangement of a needle center position and another needle center position on an X-Y plane.

FIG. 7 is an explanatory diagram illustrating an arrangement of the needle center position $c_1$ and the needle center position $c_2$ on the X-Y plane (a horizontal surface).

If the pre-calibration needle center position (a position in the front end coordinate system) that is stored in the controller 90 is precise, even in a case where the sewing machine 10 is caused to rotate by 90°, a position change does not occur in the needle center position $c_1$ and the needle center position $c_2$ in the absolute coordinate system, but in a case where an error is included in the pre-calibration needle center position, the position change occurs in the needle center position $c_1$ and the needle center position $c_2$.

As illustrated in FIG. 7, in a case where a discrepancy in position between the needle center position $c_1$ and the needle center position $c_2$ occurs, in the absolute coordinate system, the CPU 91 obtains an arc-shaped vector b with a center angle of 90° directed counterclockwise capable of connecting these points $c_1$ and $c_2$, and calculates a center position $c_0$ of the arc-shaped vector b.

Because the controller 90 causes the sewing machine 10 to rotate about this center position $c_0$, (center position $c_0$=pre-calibration needle center position), this is compensated for to obtain a correct position.

Specifically, a value that results from subtracting position coordinates of the center position $c_0$ in the absolute coordinate system from position coordinates of the needle center position $c_1$ in the absolute coordinate system is set to a compensation value, and the compensation value is converted into a value in the front end portion coordinate system. Thereafter, a result of the conversion is added to the pre-calibration center position that is stored in the controller 90, to obtain a new needle center position for amendment.

Compensation may be performed by subtracting the center position $c_0$ from the position coordinates of the needle center position $c_2$ in the absolute coordinate system.

Accordingly, the precise needle center position of the sewing machine 10 is calculated (Step S13).

Then, for update, the CPU 91 replaces needle center position data on the sewing machine within the data memory 94 with X-Y coordinate data in the front end portion coordinate system, which indicates a newly-obtained needle center position of the sewing machine (Step S15).

Accordingly, the calibration processing is ended.

The calibration processing may be configured to be performed on the sewing system 100 in an initial stage only one time prior to shipment shipping, be performed each time the sewing machine 100 is mainly powered on, and be performed periodically. The calibration processing may be possibly arbitrarily performed from an operation portion that is provided together in the controller 90.

Acquisition Processing of Amount of Backlash in Sewing System

The joint 113 of the robot arm 110 can cause backlash when the rotation direction is switched to the opposite direction.

However, in most cases, because a rotation axis of the joint 113 other than the first joint 113A is in a state where an inclination with respect to the vertically upward and downward direction occurs according to a change in the posture of the robot arm 110, the back lash is difficult to occur under the influence of gravity, but because only the rotation axis of the first joint 113A always maintains the vertically upward and downward direction, and thus it is easy for the backlash to occur.

Because the first joint 113A is a joint of the robot arm 110, which is the closest to the base end portion (an understructure), when the backlash occurs, the greatest influence is easy to exert on the front end portion of the robot arm 110 in terms of the precision of the position.

Therefore, the controller 90 performs the acquisition processing that acquires an amount of backlash in the first joint 113A.

Figure 8:
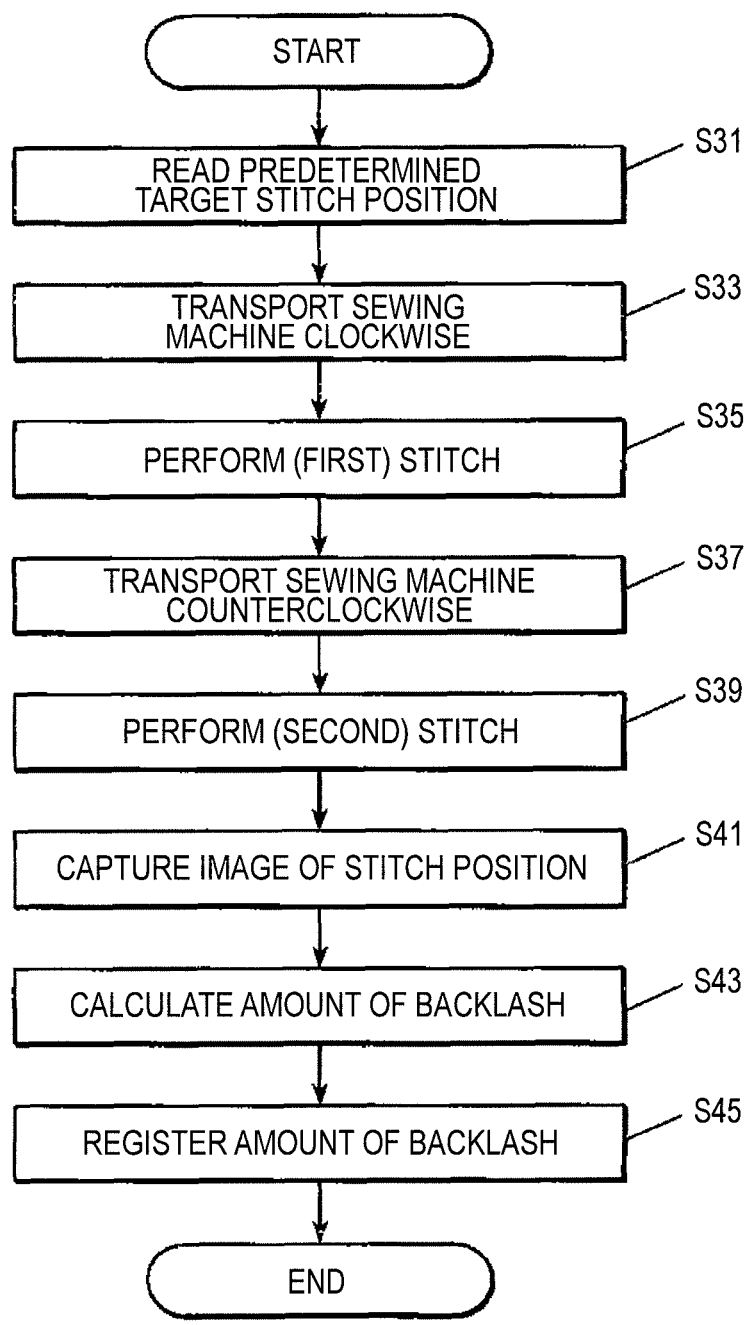
FIG. 8 is a flowchart for acquisition processing of an amount of backlash.

FIG. 8 is a flowchart for the acquisition processing of the amount of backlash, which is performed by the CPU 91 of the controller 90 based on the program.

First, the CPU 91 performs processing that reads position coordinate data in the absolute coordinate system, which indicates a predetermined target stitch position, from the data memory 94 (Step S31).

Next, the CPU 91 causes the servomotor 114 of each of the robot arms 110 to be driven to transport the sewing machine 10 to the predetermined target stitch position (Step S33).

At that time, the first joint 113A of the robot arm 110 performs the transportation of the sewing machine 10 along a track for reaching the target stitch position, while performing the rotation operation in a fixed direction (for example, a clockwise direction).

A workpiece or a jig that is easy to recognize from the capture image of the stitch position in the case where the stitch is performed is installed in a predetermined target position is installed.

Next, in the target position, the CPU 91 causes the sewing machine motor 24 to be driven, and thus, the first stitch is performed to form a third stitch position (Step S35). At this time, the sewing machine 10 maintains the reference posture in which the longitudinal direction (the upward and downward direction of the needle) of the needle bar 12 is in parallel to the vertically upward and downward direction, and performs the stitch.

Next, the CPU 91 causes only the first joint 113A of the robot arm 110 to rotate at a predetermined rotation angle in the fixed direction (for example (the clockwise direction) described above, and thereafter performs the rotation operation at the same rotation angle in the opposite direction (for example, the counterclockwise direction) and performs a transportation operation of returning the sewing machine 10 to the target stitch position described above (Step S37).

Again in the target position, the sewing machine motor 24 is caused to be driven to perform the second stitch and form a fourth stitch position (Step S39).

Next, the CPU 91 causes the servomotor 114 of each of the robot arms 110 to be driven so that both the first and second stitch positions also fall within the image capture range of the camera 15, and thus causes the sewing machine 10 to be moved in order for the camera 15 to capture images of the third and fourth stitch positions (Step S41).

Figure 9:
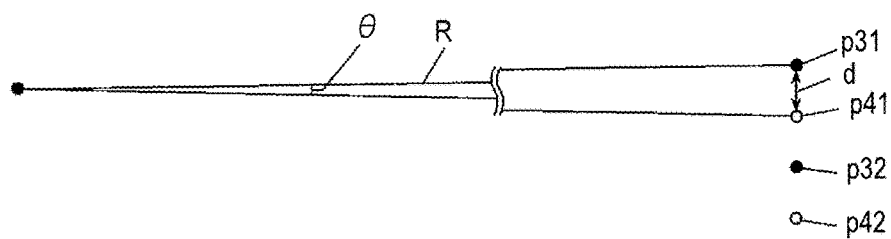
FIG. 9 is an explanatory diagram illustrating capture images at third and fourth stitch positions.

FIG. 9 is an explanatory diagram illustrating capture images of the third and fourth stitch positions.

The pattern matching and the like are performed from the captured image by the image processing device 15a to extract the third and fourth stitch positions. The CPU 91 calculates an amount of backlash in the first joint 113A (Step S43).

That is, the CPU 91 specifies third stitch positions p31 and p32 and fourth stitch positions p41 and p42 that result from the first two sewing needles, which are extracted, in the absolute coordinate system.

Of these, the CPU 91 calculates a distance d between the stitch positions p31 and p41 from a distance within the capture image, with focus being placed on the stitch positions p31 and p41 that result from the same sewing needle 11 (which may be the stitch positions p32 and p42).

The CPU 91 detects angles of all joints 113 of the robot arm 110 from the encoder 115, and calculates a distance from the center axis of the first joint 113A of the robot arm 110 to the front end portion of the arm, when viewed from above. A distance R from the center axis of the first joint 113A to the sewing needle 11, when viewed from above, is calculated with reference to the position coordinates of the needle center position of the sewing machine 10 that is obtained from design data on a distance from a holding position of the sewing machine 10 in the front end portion of the robot arm 110 to the sewing needle 11, or is obtained in the calibration processing described above.

On the other hand, in a case where the distance d is sufficiently smaller than the distance R, if an amount of backlash in the first joint 113A is set to θ, because this is regarded as R sinθ=d, calculation is performed using angle θ=sin$^{-1}$(d/R) that is the amount of backlash in the first joint 113A.

The CPU 91 registers a value of the angle θ that is the amount of backlash in the first joint 113A with the data memory 94 (Step S45), and ends the acquisition processing of the amount of backlash.

In a case where the switching from the direction of the rotation of the first joint 113A to the opposite direction takes place in the operation of the robot arm 110, the amount of backlash is referred to as the compensation value.

The acquisition processing of the amount of backlash may be configured to be performed only one time prior to shipment in the sewing system 100 in the initial stage, be performed each time the sewing system 100 is mainly powered on, be performed periodically, and be possibly arbitrarily performed from the operation portion that is provided together in the controller 90.

Effects of Embodiments

In the sewing system 100 described above, the controller 90 performs the stitch before and after the controller 90 causes the rotation about the rotation axis that passes through the pre-calibration needle center position, which is stored in the controller 90, to rotate the sewing machine 10 at a prescribed angle. Furthermore, the controller 90 performs the calibration processing that calibrates the needle center position that is stored in the controller 90, based on the first stitch positions p11 and p12 and the second stitch positions p21 and p22 within the image capture ranges of the capture images that are obtained by capturing the images of the first stitch positions p11 and p12 and the second stitch positions p21 and p22 that are formed as a result of performing the stitch, using the camera 15.

For this reason, by controlling each portion of the sewing system 100 without performing measurement or the like that requires human hands, the controller 90 can precisely recognize the actual needle center position of the sewing machine 10 and the robot arm 110 can precisely position the stitch position of the sewing machine 10. Thus, it is possible that an improvement in sewing quality is achieved.

It is possible that a work load of the calibration processing is reduced.

Furthermore, in the sewing system 100 described above, for the stitch position that is set to be a target, the controller 90 captures the images of the third stitch positions p31 and p32 that are formed after the positioning by the rotating in a fixed direction in the first joint 113A and the fourth stich positions p41 and p42 that are formed after the positioning by the rotation in the opposite direction in the first joint 113A, using the camera 15. Furthermore, the controller 90 performs the acquisition processing of the amount of backlash that occurs in the first joint 113A, based on each of the positions p31 and p41 of the third stitch positions p31 and p32 and the fourth stitch positions p41 and p42 within the image capture ranges of the capture images.

For this reason, by acquiring the amount of backlash that occurs in the first joint 113A of the sewing machine 10, the control of the operation for the compensation in which the amount of backlash is considered is performed in the operation of positioning the stitch position of the sewing machine 10. Thus, because the robot arm 110 can precisely position the stitch position of the sewing machine 10, it is possible that an additional improvement in sewing quality is achieved.

Others

In the calibration processing, the images of the stitch position that results from the first stitch and the stitch position that results from the second need stitch are captured at the same time, but the image capture may be individually performed for each stitch.

This is true for the case of the acquisition processing of the amount of backlash.

In the sewing machine 10, the optical axis of the camera 15 runs forward to be in parallel to the longitudinal direction of the needle bar 12, but the optical axis of the camera 15 may run downward in an inclination direction.

The laser 16 is used as a light source that emits the slit light to the workpiece in order for the camera 15 to suitably capture the image of the reference line, but any that can emit the slit light, such as an LED or an electric lamp, may be used.

The invention claimed is:

1. A sewing system comprising:

a sewing machine;

a camera that captures an image of a reference position for sewing;

a robot aim that holds the sewing machine and the camera; and a controller, wherein the controller controls operations of:

forming a first stitch position that results from stitching of the sewing machine; and forming a second stitch position that results from stitching of the sewing machine after rotating the sewing machine at a prescribed angle about a rotation axis that passes through a needle center position stored by the controller, and the controller further performs calibration processing that calibrates the needle center position stored by the controller, based on each position of the first stitch position and the second stitch position within image capture ranges of capture images that are obtained by capturing images of the first stitch position and the second stitch position using the camera.

2. The sewing system according to claim 1, wherein the robot arm includes a first joint that causes the entire robot aim to rotate about an axis in a vertically upward and downward direction, for a stitch position that is set to be a target, the controller controls operations of:

forming a third stitch position using the sewing machine after a positioning operation that results from rotation in a fixed direction in the first joint and forming a fourth stitch position using the sewing machine after a positioning operation that results from rotation in a direction opposite to the fixed direction in the first joint;

capturing images of the third stitch position and the fourth stitch position using the camera; and acquiring an amount of backlash that occurs in the first joint, based on each position of the third stitch position and the fourth stitch position within image capture ranges, respectively.

* * * * *